United States Patent

Hallman et al.

[15] 3,650,743

[45] Mar. 21, 1972

[54] METHODS FOR MAKING LITHOGRAPHIC OFFSET PLATES BY MEANS OF ELECTROMAGNETIC RADIATION SENSITIVE ELEMENTS

[72] Inventors: Robert W. Hallman, Utica; Gary W. Kurtz, Southfield, both of Mich.

[73] Assignee: Teeg Research, Inc., Detroit, Mich.

[22] Filed: Aug. 14, 1969

[21] Appl. No.: 850,184

Related U.S. Application Data

[63] Continuation-in-part of Ser. No. 673,410, Oct. 6, 1967, abandoned.

[52] U.S. Cl. ....................96/33, 96/36, 96/36.3, 156/3, 156/4, 156/14, 156/17, 156/18, 101/463, 101/467, 250/65 R, 250/65.1

[51] Int. Cl. ....................G03f 7/02

[58] Field of Search ....................96/1.5, 33, 36, 36.2, 36.3, 96/86, 88; 252/501; 117/93.3, 217; 156/3, 4, 17, 18, 14; 101/463, 467; 204/157.1; 250/65, 65.1

[56] References Cited

UNITED STATES PATENTS

| | | | |
|---|---|---|---|
| 3,122,463 | 2/1964 | Ligenta et al. | 156/4 |
| 3,271,180 | 9/1966 | White | 96/36 X |
| 3,346,384 | 10/1967 | Gaynor | 96/36 |
| 3,377,169 | 4/1968 | Blake | 96/88 |
| 3,386,823 | 6/1968 | Keller et al. | 96/27 |
| 3,440,046 | 4/1969 | Droege et al. | 96/27 |

FOREIGN PATENTS OR APPLICATIONS

| | | |
|---|---|---|
| 344,354 | 3/1931 | Great Britain |
| 968,141 | 8/1964 | Great Britain |
| 1,151,310 | 9/1969 | Great Britain |

OTHER PUBLICATIONS

Kostyshin et al., " Photographic Sensitivity Effect in Thin Semiconducting Films on Metal Substrates," Soviet Physics–Solid State, Vol. 8, No. 2, Feb. 1966, pp. 451–452

*Primary Examiner*—George F. Lesmes
*Assistant Examiner*—R. E. Martin
*Attorney*—Hauke, Gifford and Patalidis

[57] ABSTRACT

Methods for making lithographic offset plates and the like by means of electromagnetic radiation sensitive elements comprising essentially a metallic layer or a layer of silicon, a layer of an inorganic material capable when exposed to electromagnetic actinic radiation to form an interreaction product with the metallic layer, and a support member. The methods consist of exposing the radiation sensitive elements to an actinic image projected thereon for causing selective and discrete interreaction between silicon or the metal or metals of the first layer and the inorganic material, such reacted portions having hydrophilic or oleophilic qualities different from the unreacted portions of the elements.

3 Claims, 7 Drawing Figures

INVENTORS
ROBERT W. HALLMAN
GARY W. KURTZ

BY Hauke, Gifford, & Patalidis
ATTORNEYS

METHODS FOR MAKING LITHOGRAPHIC OFFSET PLATES BY MEANS OF ELECTROMAGNETIC RADIATION SENSITIVE ELEMENTS

CROSS REFERENCE TO RELATED APPLICATIONS

The present application is a continuation-in-part of application Ser. No. 673,410, filed Oct. 6, 1967, now abandoned, and is copending with and related to applications Ser. Nos. 839,038, filed July 3, 1969, 841,416, filed July 14, 1969 and 841,718, filed July 15, 1969.

BACKGROUND OF THE INVENTION

In the copending applications enumerated above, there are disclosed radiation sensitive elements which typically consist of a metallic layer or a layer of silicon, hereinafter referred to as a metallic layer coated with a layer of an inorganic material capable of interreacting with the silicon, or the metal or metals of the metallic layer when exposed to incident electromagnetic actinic radiation such as, for example, ordinary white light. As the results of selective and discrete exposure to electromagnetic actinic radiation in intensity and duration sufficient to cause an interreaction of the irradiated portions of the two layers, there is selectively and discretely caused the formation of an interreaction product having chemical and physical characteristics different from the non-irradiated portions of the element.

SUMMARY OF THE INVENTION

The present invention contemplates making lithographic offset plates and the like by appropriately exposing to an electromagnetic radiation image a radiation sensitive element made according to the aforesaid copending applications and, without any further processing, or, at most, after effecting a simple washing of the plates in an appropriate solvent, by utilizing the plates for printing by the offset process, as a result of the differences in hydrophilic and oleophilic qualities of the exposed portions of the plates as compared to the unexposed portions thereof.

The several objects and the many advantages of the present invention will become apparent when the accompanying description of some examples of the best modes contemplated for practicing the invention is read in conjunction with the accompanying drawings wherein like reference numerals refer to like or equivalent elements and in which:

BRIEF DESCRIPTION OF THE DRAWINGS

FIG. 6 is a schematic representation of the electromagnetic radiation sensitive element of FIG. 5 after selective and discrete exposure to electromagnetic radiation, in a form suitable for use as a lithographic offset plate or the like.

DETAILED DESCRIPTION OF THE PREFERRED EMBODIMENTS

Figure 1:
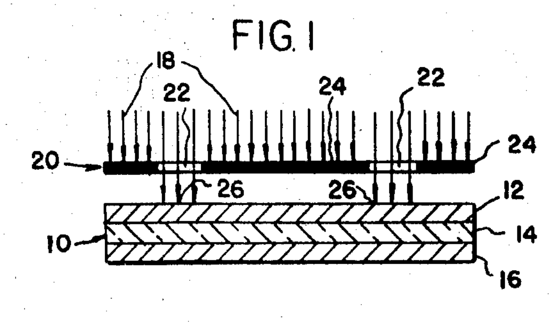
FIG. 1 is a schematic representation of a section of a radiation sensitive element according to the present invention in the process of being selectively and discretely exposed to electromagnetic actinic radiation.

Referring to the drawings, and more particularly to FIG. 1 thereof, there is shown in a schematic exaggerated sectional view a typical radiation sensitive element 10 comprising essentially three dissimilar layers substantially adhering to each other. The first, or topmost, of such layers is a metallic layer 12 disposed in adhesion and in intimate contact with a second layer 14 of an inorganic material capable, when exposed to electromagnetic radiation, of interreacting with the metal or metals of the metallic layer 12. The layer 14 is in turn disposed in adhesion upon a support member or third layer 16 of a material incapable of interreacting with the second layer 14 even if exposed to electromagnetic actinic radiation.

As disclosed in detail in the copending application, Ser. No. 839,038, and in the other copending applications hereinbefore referred to, the metallic layer 12 of the radiation sensitive element 10 comprises a metal or silicon, either alone or alloyed or mixed with another metal or with other metals. A list of metals particularly suitable for the layer 12 includes silver, copper, lead, cadmium, zinc, iron, tin, arsenic, bismuth, cobalt, indium, manganese, mercury, nickel, selenium, tellurium, thallium, and vanadium. Such layer 12 is in the form of a thin coating of the layer 14 of inorganic material of a thickness that may vary from a few atoms layers to several thousand Angstroms such that the layer 12 is substantially "transparent," i.e., has substantially good transmissivity to the actinic radiation.

The layer 14 of inorganic material is also substantially thin, of the order of a few atom layers to several microns, or even a few mils, and it may consist of any one of a variety of ternary and binary inorganic materials and compounds and any one of a few elements. An example of ternary material, which has been found to be particularly suitable, is a glassy material consisting of arsenic, sulfur and iodine for example in the following proportions: arsenic — 40 percent by weight, sulfur — 50 percent by weight and iodine — 10 percent by weight, although the proportion of iodine may be within the range of 1 to 30 percent by weight. Appropriate examples of such ternary materials are given in U.S. Pat. No. 3,034,119, issued Mar. 6, 1962. Chlorine, bromine, selenium, thallium or tellurium may be substituted for the iodine.

A multitude of binary compounds and mixtures have been found to be useful for the inorganic material of the layer 14. Examples of such binary compounds or mixtures comprise halides of metals, such as copper, antimony, arsenic, sulfur, thallium, lead, cadmium and silver, and sulfides, arsenides, selenides and tellurides of such metals. The most suitable materials, presenting substantial actinic sensitivity when deposited on a metallic layer of copper, silver, lead, zinc, etc., for example are arsenic-sulfur mixtures and compounds, antimony-sulfur compounds and mixtures, silver-sulfur compounds and mixtures, bismuth-sulfur compounds and mixtures, chromium-sulfur compounds and mixtures, lead iodide, copper chloride, stannous chloride, mercury chloride, arsenic selenides, selenium-sulfur compounds and mixtures, chromium selenides, and indium-sulfur compounds and mixtures. It seems that the property of reacting with a metallic layer under the influence of electromagnetic actinic radiation is shared by a variety of mixtures and compounds, having such property to varying but generally useful degrees. Such binary compounds and mixtures may be generally cataloged as consisting of a metal halide or a mixture of a metal with a halogen, metal selenide or a mixture of a metal with selenium, metal sulfide or a mixture of a metal with sulfur, and metal telluride or a mixture of a metal with tellurium. Stoichiometric proportions are not critical, but it is preferable that the resulting material be substantially transparent to electromagnetic actinic radiations of an appropriate wavelength, especially when the layer is substantially thick.

Single elements, such as halogens, are also capable of reacting with a metallic layer when exposed to electromagnetic actinic radiation.

A general grouping of inorganic materials suitable for forming an actinically reactive layer when disposed in juxtaposition with a metallic layer therefore consists of halogens, sulfur, selenium, M-X compounds and mixtures and M-X-Y compounds and mixtures, wherein M is a metal and X and Y are selected from the group consisting of a halogen, sulfur, selenium and tellurium; the metal M in the compounds and mixtures is selected from the group consisting of arsenic, antimony, bismuth, selenium, tellurium, copper, zinc, cadmium, mercury, lead, chromium, gallium, indium, thallium, germanium, tin, iron, cobalt, nickel and silver.

A particularly suitable binary material presenting substantial sensitivity when disposed in a layer with a layer of silicon or silver, copper, cadmium, lead, zinc or other metal is an arsenic-sulfur compound or mixture in a glassy or vitreous form and which presents remarkably good radiation transmissivity from the infrared to the ultraviolet region of the electromagnetic spectrum. For example, by using a layer 14 of arsenic-sulfur placed in juxtaposition with a metallic layer 12 of silver, the quality of the processed image obtained in the lithographic plate is remarkable in its resolution which may be as low as 500–1,000 A. The proportions of arsenic and sulfur may be any adequate proportion which preferably form a vitreous material, such proportions preferably ranging from about 40 percent arsenic — 60 percent sulfur by weight to 70 percent arsenic — 30 percent sulfur by weight.

The support member or third layer 16 provides a convenient, substantially flexible mechanical support for the two-layer assembly of the metallic layer 12 and the layer 14, such layers 12 and 14 being substantially thin, from a few atom layers to several thousand Angstroms, as previously mentioned while the support member or third layer 16 is preferably a few thousandth of an inch thick. The material of the support member or third layer 16 may be any convenient material, but it is preferably a metal such as for example aluminum or steel. A typical example of configuration for a radiation sensitive element 10, FIG. 1, for example, consists of an aluminum support member or third layer 16, a few thousandths of an inch thick, provided with a coating of arsenic-sulfur, several thousand Angstroms thick, forming a second layer 14, provided in turn with a metallic layer 12 made of silver, a few atom layers or Angstroms thick, thus thin enough to be substantially transmissive of electromagnetic actinic radiation such as intense white light, an electrom beam, or the like.

Any one of the inorganic materials hereinbefore disclosed may be substituted for the arsenic-sulfur material, and silicon or any one of the metals hereinbefore disclosed may be substituted for silver with varying degrees of performance results. The radiation sensitive element 10 is prepared, for example, according to the following process given for illustrative purpose only.

The plate of aluminum constituting the third layer or support member 16 of any appropriate linear dimensions, 1 or 2 mils thick, is placed in a bell jar evacuated at about 0.1 micron pressure. A quartz crucible is placed in the bell jar in an electrical resistance heater and is loaded with pieces of the arsenic-sulfur inorganic material, such as for example arsenic-trisulfide, $As_2S_3$. The surface of the aluminum support member 16 is typically located at a distance of about 6 inches from the quartz crucible. The arsenic trisulfide is heated in the crucible to about 350° to 400° C., and a thin film of arsenic trisulfide, forming the second layer 14, is deposited on the surface of the support member 16 by evaporating the arsenic trisulfide from the quartz crucible for about 30 to 40 seconds, thus providing a thickness of the second layer 14 of approximately 1 micron. Longer deposition times provide greater thickness of the layer, while shorter deposition time provide proportionally thinner layers.

Any one of the herein mentioned inorganic materials may be substituted for the arsenic trisulfide, as previously mentioned, and other techniques may be used for depositing the layer 14 upon the support member 16. For example, the inorganic material may be dissolved in an appropriate solvent and painted or sprayed over the surface of the support member, or cathode sputtering and other techniques may be used with equal success.

Vapor deposition techniques may also be used for depositing on the top of the second layer 14 of arsenic trisulfide a metallic layer 12 of any silicon or of the metals hereinbefore listed. Typically, the support member 16 having a superficial layer of arsenic trisulfide 14 thereon is placed in a bell jar evacuated at about 0.5 micron pressure. Silver metal, for example, is evaporated from tungsten electrical resistance heaters brought to about 1,100° C. by the passage of electrical current therethrough, a silver coating or ribbon being disposed on the tungsten filament. By evaporating the silver for about 3 seconds, a silver layer 12 condensed on the arsenic trisulfide layer 14 is obtained, having a thickness of about 4,000 A. Shorter evaporation times provide proportionally thinner silver layers while longer evaporation times provide proportionally thicker silver layers, although it is obvious that too thick a silver layer should be avoided as it may not be sufficiently transmissive of the actinic radiation subsequently used for exposure of the element. The thickness of the thin film or layer 18 of silver can be continuously monitored by means of a thickness monitor and is preferably of the order of several thousand Angstroms.

Other methods may be used for providing the inorganic material layer 14 with a metallic layer 12. For example, silicon or metal powder having grains in the submicron scale may be placed on the surface of the layer of the inorganic material and rubbed and wiped thereon until the inorganic material is provided with a very thin coating of adhering silicon or metal powder. Alternately, a metallic paste similar to the type used for making printed circuits may be painted or sprayed as a very thin coating on the surface of the inorganic material layer. Commercially available metal transfer sheets of the type consisting of a thin plastic substrate having thereon a thin metallic layer transferrable to another surface by pressure may also be used, or the metallic layer may be placed on the surface of the inorganic material layer in the form of an aqueous, or other solution, of a silicon salt or a metallic salt which is subsequently chemically reduced to silicon or the metal.

The radiation sensitive element 10 is exposed, selectively and discretely, to incident electromagnetic actinic radiation 18 caused to impinge upon the metallic layer 12 through a mask 20 provided with an appropriate pattern consisting of portions, such as shown at 22, which are substantially transmissive of the incident actinic radiation, while other portions 24 are substantially non-transmissive of the radiation. Alternately, an image may be projected by any appropriate well-known projection means, upon the surface of the metallic layer 12, to form an appropriate image or pattern thereon.

Figure 2:
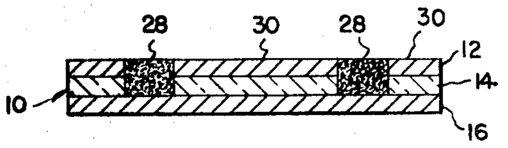
FIG. 2 is a schematic representation of a lithographic plate, or the like, made by means of the electromagnetic radiation sensitive element of FIG. 1.

The electromagnetic actinic radiation selectively and discretely impinging upon the surface of the metallic layer 12 at areas as shown at 26, is transmitted to the inter-boundary layer between the metallic layer 12 and the layer 14 at selective and discrete areas corresponding to the irradiated surface areas 26, causing a selective and discrete interreaction between the silicon or the metal or metals of the metallic layer 12 and the inorganic material of the layer 14. For sufficient exposure, in duration of time and radiation intensity, generally from several seconds to a few minutes exposure to a conventional carbon arc lamp as is commonly used in the lithographic art, there are formed reacted surface areas, corresponding to such irradiated areas, which, as shown at 28 in FIG. 2, are formed by the interreaction product resulting from such selective and discrete interreaction between the silicon or the metal or metals of the metallic layer 12 and the inorganic material of layer 14. Other superficial areas of the metallic layer 12, as shown at 30, remain undisturbed. The interreaction product at the areas 28 has been found to have generally oleophilic qualities, while the non-reacted undisturbed surface portions 30 of the metallic layer 12 have substantially hydrophilic qualities. Choice of the metallic layer 12 and the material of layer 14 can predetermine the direction of wetting. Consequently, the exposed radiation sensitive element 10 shown in FIG. 2 can be used as a lithographic offset plate or the like without any further processing. This is done in the manner well known in the art of printing by lithographic offset plates by attaching a plate such as illustrated at FIG. 2 on a drum in a printing machine, by wetting its surface with a film of water and by subsequently inking the plate surface. The hydrophilic surface portions 30 of the plate absorb water during the wetting operation and become thus ink-repellant during the inking operation. The non-wettable surface portions 28 of the plate, in view of their oleophilic qualities, accept the ink during inking, and the lithographic plate can thus be used to appropriately discretely and selectively ink a printing belt or the like which in turn is used to directly print upon an appropriate printable material. Such a plate is a negative working lithographic plate.

EXAMPLE 1

A radiation sensitive element 10 consists of a support member 16 made of aluminum foil coated with a layer 14, a few microns thick, made of arsenic trisulfide and having in turn a coating of silver forming the metallic layer 12, two to three thousand Angstroms thick. After selective and discrete exposure to electromagnetic actinic radiation from an arc lamp through a mask for 3 to 5 minutes, the resulting lithographic plate shows oleophilic qualities with respect to the irradiated reacted surface portions and hydrophilic qualities with respect to the unreacted surface portions. Such an element is a negative working lithographic plate.

EXAMPLE 2

A radiation sensitive element 10 consisting of an aluminum support member 16 coated with a layer 14 of arsenic pentasulfide, a few microns thick, provided with a metallic layer 12 of silver a few atom layers thick, is prepared, before exposure to electromagnetic actinic radiation, by cleaning of the silver surface with a mild nitric acid solution and coating of such surface with gum arabic. After exposure for about 5 minutes to an arc lamp, the unreacted silver surface area portions have hydrophilic qualities, while the reacted surface portions have oleophilic qualities.

EXAMPLE 3

An element 10 consisting of an aluminum support member 16 provided with a layer 14 of arsenic pentasulfide, a few atom layers thick, in turn provided with a metallic layer 12, a few atom layers to a few Angstroms thick, made of copper, after selective and discrete exposure to electromagnetic radiation for about 15 minutes from an arc lamp, presents reacted portions having hydrophilic qualities, while the unreacted copper metal portions have oleophilic qualities.

Figure 3:
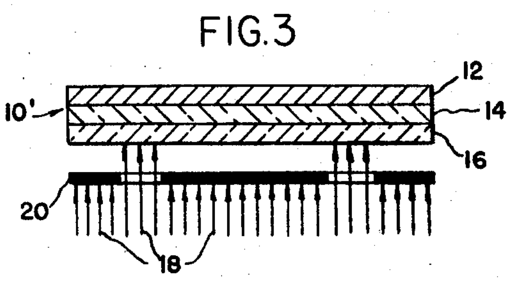
FIG. 3 is a schematic representation of a section of a modification of the electromagnetic radiation sensitive element of FIG. 1, shown in the course of selective and discrete exposure to electromagnetic actinic radiation.
Figure 4:
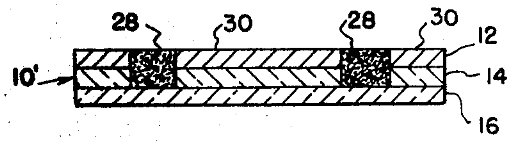
FIG. 4 is a lithographic plate, or the like, made by way of the electromagnetic radiation sensitive element of FIG. 3.

FIG. 3 schematically represents, in section, a modified radiation sensitive element 10' provided with a radiation transmissive support member or third layer 16, such as a thin transparent layer of a plastic material. With such an arrangement of elements, it is thus possible to discretely and selectively expose the radiation sensitive element 10' to electromagnetic actinic radiation impinging upon the surface of the transmissive support member or third layer 16, as illustrated in FIG. 3. The resulting article is a lithographic offset plate, as shown at FIG. 4, which is in all other respects substantially alike the lithographic offset plate of FIG. 2.

Figure 5:
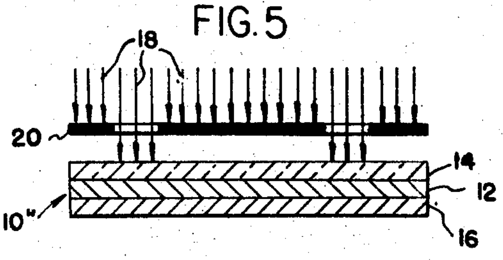
FIG. 5 is a schematic representation of a section of a further modification of an electromagnetic radiation sensitive element for practicing the present invention, in the process of being selectively and discretely exposed to electromagnetic actinic radiation.

Referring now to FIG. 5, there is schematically shown in section a radiation sensitive element 10'' comprising a first layer, of the same material as any of the inorganic materials hereinbefore disclosed as suitable for the material of the layer 14 of the element of FIG. 1 or FIG. 3, such first layer 14 being placed in adhesion on a metallic layer 12 which in turn is disposed in adhesion on a support member or third layer 16.

As a typical example of structure, the first layer 14 is made of any one of the materials hereinbefore listed with respect to the embodiment of FIG. 1, such as for example arsenic trisulfide or arsenic pentasulfide, the metallic layer 12 may be any one of the silicon or metals or mixture of metals previously indicated, such as silver or a silver-copper alloy, and the third layer or support member 16 may be any convenient material, preferably aluminum.

Figure 6:
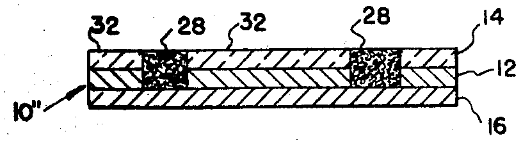

After selective and discrete exposure to electromagnetic actinic radiation 18 through a mask 20, as shown in FIG. 5, or alternately by means of an electromagnetic radiation image projected on the outer surface of the first layer 14, the exposed electromagnetic radiation sensitive element 10'' is, as shown schematically in section at FIG. 6, provided with selective and discrete surface areas 28 formed by the interreaction product resulting from the radiation provoked reaction between the silicon or the metal or metals of the metallic layer 12 and the inorganic material of the layer 14, the surface areas 32 of the layer 14 remaining unreacted. In view of the hydrophilicity to oleophilicity ratio of the unreacted areas 32, the element of FIG. 6 is useful as a lithographic offset plate, or the like, but, preferably, as it has been found through experimentation, for most applications it is best to remove the unreacted portions 28 and the remaining portions of the first layer 14. This is accomplished by mechanical stripping, as explained in detail in the aforesaid copending applications, or alternately, by washing the exposed element of FIG. 6 in a mild solution of sodium hydroxide which dissolves the remaining unreacted portions of the first layer 14 and the reacted portions 28, thus providing the lithographic offset plate of FIG. 7 having only the support backing 16 and the remaining unreacted portions 34 of the metallic layer 12. The removal of the reacted portions 28 and of the remaining portions of the first layer 14 is facilitated by brushing or wiping the surface of the plate or by spraying with a water jet or spray.

Figure 7:
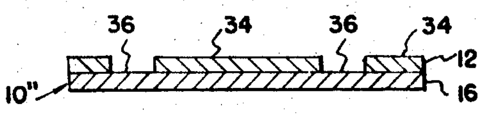
FIG. 7 schematically represents an alternate configuration for a lithographic offset plate, or the like, made according to the present invention by means of the electromagnetic radiation sensitive element of FIG. 5.

The resulting lithographic offset plate of FIG. 7 is thus a bimetal plate comprising a metallic support member 16, for example of aluminum, having portions of its surface covered or masked by a different metal such as silver, defined by the remaining portions 34 of the metallic layer 12. Although the exaggerated representation of FIG. 7 shows the physically exposed areas 36 of the metal support member 16 as recessed with respect to the surface of the areas 34 of the metallic layer 12, it should be appreciated that such difference in levels amounts in reality only to a few atom layers or Angstroms. The exposed areas 36 of the metal support member 16 are generally hydrophilic, while the surface of the remaining portions 34 of the metallic layer 12 are generally oleophilic. The hydrophilic quality of the exposed surface areas 36 of the support member 16 may be substantially increased by pre-graining the surface of the support member 16 before applying thereon the metallic coating or layer 12 during manufacturing of the radiation sensitive plate. Such pre-graining of the surface of metal support member 16 may be effected by brushing, anodizing, or ball graining, and further enhances the interlayer adhesion between the support member 16 and the metallic layer 12.

EXAMPLE 4

A radiation sensitive element 10' having a grained aluminum support member 16 provided with a silver metallic layer 12, several thousand Angstroms thick, provided in turn with a surface layer 14 of arsenic trisulfide, a few microns thick, after selective and discrete exposure to electromagnetic actinic radiation for 5—10 minutes by means of an arc lamp and wash in a mild solution of sodium hydroxide, presents unreacted silver portions having relative oleophilic qualities and grained aluminum portions, corresponding to the irradiated reacted areas, having relative hydrophilic qualities.

EXAMPLE 5

A radiation sensitive element 10' consisting of a grained anodized aluminum support member 16 provided with a silver metallic layer 12, a few microns thick, covered in turn with a layer 14 of copper chloride, also a few microns thick, is discretely and selectively exposed to electromagnetic actinic radiation for 5—10 minutes by means of an arc lamp. The exposed element is used as a lithographic plate by being placed in a printing press, and the water wash preceding the inking of the plate is sufficient to wash away the unreacted copper chloride and the product resulting from the interreaction between the copper chloride and the silver. The remaining silver areas are oleophilic, while the grained aluminum areas corresponding to the irradiated and reacted areas are hydrophilic.

It is obvious that the lithographic offset plates having the configuration of FIG. 7 can be stored away, after use, for a very long period of time without deterioration, as they consist exclusively of two superimposed metallic layers which cannot interreact with each other. Although the lithographic plates, as illustrated at FIG. 2, FIG. 4 or FIG. 6, still include the potentially reactive pair of the metallic layer 12 and of the inorganic material layer 14, inking of the surface of the metallic layer 12 of FIG. 2 and of the surface of the inorganic material layer 14, FIG. 6 provides a radiation opaque coating, which permits storing of the plates under the usual procedure, such as placing each plate in an envelope in a drawer, and thus provides indefinite storage life. For practical purposes, the same procedure of storing the plate in an envelope in a drawer is adequate for plates according to FIG. 4, although it is possible to coat the surface of the transmissive support member 16 with an opaque print or lacquer to render it non-transmissive, if so desired.

It can thus be seen that the methods of the present invention provide means for making lithographic offset plates and the like by way of radiation sensitive elements, without requiring any complicated or delicate chemical processing of the elements after exposure to appropriate actinic radiation images.

Having thus described the invention by a few examples thereof, given for illustrative purpose only, what is sought to be protected by United States Letters Patent is as follows:

1. A method for making a lithographic offset plate by means of a radiation sensitive element comprising three dissimilar layers substantially adhering to each other, the first of said layers being selected from the group consisting of silver, copper, lead, zinc, iron, tin, arsenic, bismuth, cobalt, germanium, indium, manganese, nickel, selenium, silicon, tellurium, thallium and vanadium, the second of said layers being an inorganic material different from that of said first layer and capable when exposed to actinic radiation to form an interreaction product with said first layer, wherein said inorganic material is selected from the group consisting of sulfur, M-X compounds and mixtures and M-X-Y compounds and mixtures wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, and the third of said layers being a support material incapable of interreacting with said second layer, wherein said first layer is substantially transmissive of said actinic radiation, said method comprising impinging an actinic radiation defined image upon the surface of said first transmissive layer for causing selectively and discretely the formation of said inter-reaction product, wherein the reacted portions of said first and second layers having been selectively and discretely impinged upon by said actinic radiation with an intensity of radiation and for a period of time sufficient to form said interreaction product throughout the depth of at least said first layer are characterized by a hydrophilicity to oleophilicity ratio different from that of the portions thereof not having been impinged upon, wetting said surface, and inking said surface.

2. A method for making a lithographic offset plate by means of a radiation sensitive element comprising three dissimilar layers substantially adhering to each other, the first of said layers being selected from the group consisting of silver, copper, lead, zinc, iron, tin, arsenic, bismuth, cobalt, germanium, indium, manganese, nickel, selenium, silicon, tellurium, thallium and vanadium, the second of said layers being an inorganic material different from that of said first layer and capable when exposed to actinic radiation to form an interreaction product with said first layer, wherein said inorganic material is selected from the group consisting of sulfur, selenium, M-X compounds and mixtures and M-X-Y compounds and mixtures wherein M is a metal selected from the group consisting of arsenic, antimony, bismuth, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, and the third of said layers being a support material incapable of interreacting with said second layer, wherein said second and third layers are substantially transmissive of said actinic radiation, said method comprising impinging an actinic radiation defined image upon said third layer for causing selectively and discretely the formation of said interreaction product at the boundary between said second and first layers with an intensity of radiation and for a period of time sufficient for selectively and discretely consuming portions of said first layer, wherein the reacted portions of said first and second layers are characterized by a hydrophilicity to oleophilicity ratio different from that of the unreacted portions thereof, wetting the surface of said first layer, and inking said surface.

3. A method for making a lithographic offset plate by means of a radiation sensitive element comprising three dissimilar layers substantially adhering to each other, the second of said layers being selected from the group consisting of silver, copper, lead, cadmium, zinc, iron, tin, arsenic, bismuth, cobalt, germanium, indium, manganese, mercury, nickel, selenium, silicon, tellurium, thallium and vanadium, the first of said layers being an inorganic material different from that of said second layer and capable when exposed to actinic radiation to form an interreaction product with said second layer, wherein said inorganic material is selected from the group consisting of sulfur, selenium, M-X compounds and mixtures and M-X-Y compounds and mixtures wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, and the third of said layers being a support material incapable of interreacting with said second layer wherein said first layer and said interreaction product are soluble in a solvent and said second layer is insoluble in said solvent, said method comprising impinging an actinic radiation defined image upon said first layer for causing selectively and discretely the formation of said interreaction product at the boundary between said first and second layers with an intensity of radiation and for a period of time sufficient for selectively and discretely consuming portions of said first and second layers, selectively and discretely dissolving in said solvent said interreaction product and said first layer thus baring the unreacted portions of said second layer and portions of said third layer corresponding to areas of said interreaction product wherein the unreacted portions of said second layer are characterized by a hydrophilicity to oleophilicity ratio different from that of the bared portions of said third layer, wetting the surface of the unreacted portions of said second layer and the bared portions of said third layer, and inking said surface.

* * * * *

UNITED STATES PATENT OFFICE
CERTIFICATE OF CORRECTION

Patent No. 3,650,743 Dated March 21, 1972

Inventor(s) Robert W. Hallman et al

It is certified that error appears in the above-identified patent and that said Letters Patent are hereby corrected as shown below:

IN THE LIST OF REFERENCES CITED

Change "Ligenta" to - - Ligenza - -

IN THE SPECIFICATION

Column 1, line 11, after "1969" change the period (.) to a comma and insert thereafter - - now Patents Nos. 3,637,381, 3,637,383 and 3,637,377, respectively. - -

Column 2, line 17, after the comma (,) insert - - now Patent No. 3,637,381 - - line 42, change "3,034,119" to - - 3,024,119 - -

Column 5, line 73, after "be" insert - - silicon or - - line 74, after "the" delete - - silicon or - -

IN THE CLAIMS

Column 8, line 24, delete "layer" and insert thereinstead - - and second layers - -

Signed and sealed this 15th day of August 1972.

(SEAL)
Attest:

EDWARD M.FLETCHER,JR.
Attesting Officer

ROBERT GOTTSCHALK
Commissioner of Patents